United States Patent [19]

Amer

[11] 4,422,966
[45] Dec. 27, 1983

[54] SEPARATION OF NEUTRALS FROM TALL OIL SOAPS

[75] Inventor: Gamal I. Amer, Lawrenceville, N.J.

[73] Assignee: Union Camp Corporation, Wayne, N.J.

[21] Appl. No.: 476,599

[22] Filed: Mar. 18, 1983

[51] Int. Cl.$^3$ ............................................. C09F 1/00
[52] U.S. Cl. ................................. 260/97.6; 260/97.7
[58] Field of Search ........................... 260/97.7, 97.6

[56] References Cited

U.S. PATENT DOCUMENTS

| 3,965,085 | 6/1976 | Holmbom et al. | 260/97.7 |
| 3,969,196 | 7/1976 | Zosel | 203/49 |
| 4,308,200 | 12/1981 | Fremont | 260/97.7 |
| 4,349,415 | 9/1982 | De Filippi et al. | 203/14 |

FOREIGN PATENT DOCUMENTS 2032789  5/1980  United Kingdom .

OTHER PUBLICATIONS

Francis, Physical Chem. 58, (1954), pp. 1099–1114.
Francis, Ind. & Eng. Chem. 47 (1975) pp. 231–233.

*Primary Examiner*—H. S. Cockeram
*Attorney, Agent, or Firm*—Kane, Dalsimer, Kane, Sullivan & Kurucz

[57] ABSTRACT

The disclousre is of a process for separating neutrals from salts of fatty/resin acids by extraction of tall oil soaps with supercritical fluid solvents.

7 Claims, 1 Drawing Figure

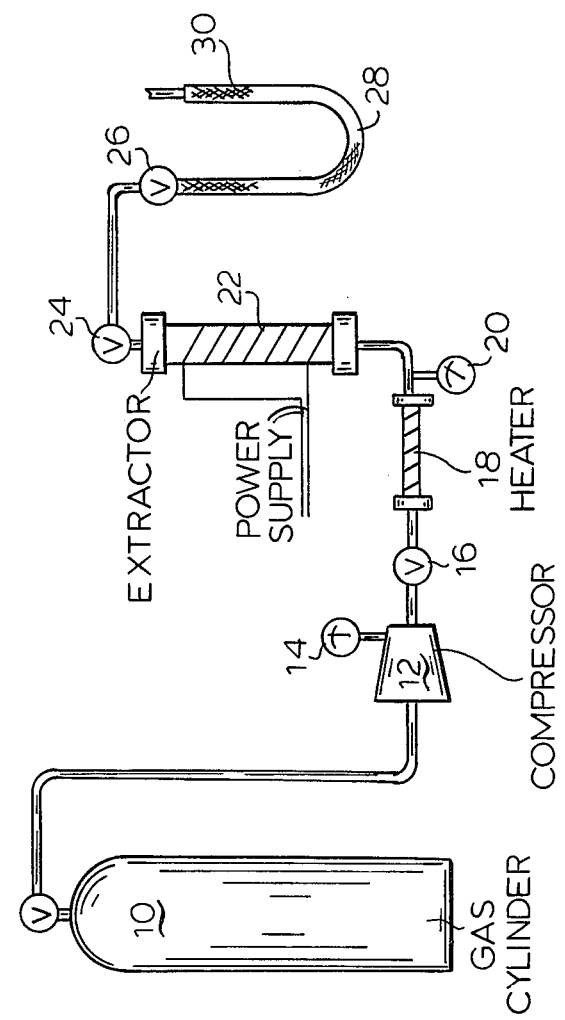

SEPARATION OF NEUTRALS FROM TALL OIL SOAPS

BACKGROUND OF THE INVENTION

1. Field of the Invention

The invention relates to the refining of tall oil and more particularly relates to the separation of neutrals from tall oil soaps.

2. Brief Description of the Prior Art

Tall oil is a well-known by-product of the sulfate or kraft process for digesting wood, obtained by the acid conversion of black liquor soap skimmings. Crude tall oil is made up of varying proportions of fatty acids, resin acids and so-called "neutrals". Crude tall oil obtained in the United States typically comprises from 18 to 53% by weight of fatty acids, 35 to 65% by weight of resin acids and 8 to 24% by weight of neutral compounds. The presence of "neutrals" in tall oils is undersirable, e.g., since the presence of neutrals can adversely affect processing of tall oil product. These compounds comprise a wide variety of alcohols, aldehydes, ketones, hydrocarbons, sterols and like compounds which may interfere with certain uses of applications of the fatty acids and/or resin acids which comprise tall oil. However, some neutral species are only separated from tall oil by techniques such as by molecular or fractional distillations. Moreover, some neutral species cannot be separated efficiently from fatty or resin acids by distillation, because of similar volatility characteristics of some neutrals compared with fatty acids and other neutrals compared with resin acids. Also, existing distillation techniques are relatively severe, not only causing tall oil degradation, but also resulting in acid loss due to neutrals reacting with acids, e.g., esterification (alcohol-type neutrals).

By the method of the present invention, the neutrals may be separated from the tall oil soaps, i.e., the salts of tall oil acids which are the black liquor soap skimmings, to reduce their content therein. The soaps processed by the method of the invention, upon acid treatment, yield tall oil of a reduced neutrals content. Neutrals have been separated from tall oil soaps by extraction in water-immiscible hydrocarbon solvents; see for example U.S. Pat. No. 3,965,085. However, such processes require relatively difficult separatory steps to recover the solvent and separate the neutrals from the extracting solvent.

The employment of gases as liquids in their near critical state and as fluids in the supercritical state to serve as an extracting solvent has been previously described; see for example Francis, Physical Chem. 58,1099 (1954) and Ind. Eng. Chem. 47, 230 (1955). Near critical and supercritical fluids, including supercritical hydrocarbon gases, have been suggested as solvents for a wide range of materials; see for example U.S. Pat. No. 3,969,196 and British Pat. No. 2,032,789. Despite the fact that the solvation properties of gases in their near critical and supercritical states and especially of supercritical hydrocarbon gases, has been known, the application of this knowledge has not been applied to tall oil soap refinement.

Advantageously the process of the invention facilitates the separation of extractive solvent from the tall oil soap and simplifies the recovery of neutrals from the extracting solvent. The process of the invention also has advantages in the more efficient utilization of energy.

SUMMARY OF THE INVENTION

The invention comprises a process for separating neutral compounds from tall oil soaps, which comprises;

contacting tall oil soap with an inert, supercritical fluid solvent for said tall oil neutral compounds, whereby said neutrals are extracted preferentially into said solvent to form a mixture of solvent and a mixture rich in neutrals, separating the solvent-extract mixture from the remainder of the contacted soap;

separating the solvent from the extracted mixture.

BRIEF DESCRIPTION OF THE DRAWING

The accompanying drawing is a schematic representation of apparatus employed in the method of the invention to extract tall oil soap with supercritical fluid solvents. This drawing is given by way of example and does not restrict the principle of general applicability of the process of the invention.

DETAILED DESCRIPTION OF THE PREFERRED EMBODIMENTS OF THE INVENTION

Compounds which are gases at ambient temperature and pressure can be converted to supercritical fluids by subjecting them to conditions such that they are at or above their critical pressures and temperatures. In the supercritical fluid state, they may become solvents for a number of organic compounds, which may be selectively dissolved therein.

In the process of the present invention, the neutral compounds may be extracted by the appropriate supercritical fluid solvent from the tall oil soap, leaving as the residue the salts of the fatty/resin acids.

Preferably, the neutral compounds are extracted from the tall oil soaps with supercritical fluid solvents for the neutrals, since they constitute a minor ingredient of the soaps. The supercritical fluids employed in this preferred process are well-known as are methods of their preparation. Representative of gases which may be converted to be selective solvents by exposing them to supercritical conditions of temperature and pressure, are hydrocarbon gases such as methane, ethane, propane, butane, ethylene, propylene and the like.

The conditions under which the above gases become supercritical fluids are well-known to those skilled in the art as is apparatus for their preparation and use in the extraction of organic materials; see for example the teachings set forth in the U.S. Pat. Nos. 3,969,196; 4,308,200; and 4,349,415. In the method of the present invention, gases are used in their supercritical fluid state to extract tall oil soaps. The supercritical fluids are brought into contact with the tall oil soaps in a suitable vessel, under supercritical conditions to extract the neutrals from the soaps. Preferably, hydrocarbon gases are employed as the supercritical fluid to extract neutral compounds from the soaps.

As shown in the accompanying drawing, a source of a suitable gas in the cylinder 10 may be fed by conduits into a compressor 12 wherein it is compressed to supercritical pressures. A preferred pressure is at least 5 psi above the supercritical pressure for the fluid employed. A pressure gauge 14 monitors the compression and valve 16 provides a means for delivery of the compressed gas to a heater 18 where the temperature of the compressed gas is raised to a supercritical temperature.

Temperature gauge 20 monitors the heating of the compressed gas which is then passed into an extractor vessel 22 which is provided with an electrical resistance heater means for maintaining the supercritical temperature. A preferred temperature for extraction is within the range of from about 0° to 300° C. Previous to introduction of the supercritical gas into extractor vessel 22, the vessel 22 is charged with a quantity of tall oil soap for extraction. When the supercritical gas is introduced into the charged extractor vessel 22, extraction of dissolved materials from the tall oil soaps immediately begins and the solute-laden solvent leaves the extractor 22 through valve 24. A residue of the tall oil soaps is left in the vessel 22. The extract with the supercritical gas is carried through an expansion valve 26 to reduce the supercritical pressure of the gas. Upon dropping the pressure of the mixture below the supercritical pressure for the gas, the extracted materials are dropped out of solution from the solvent remaining in the separator tube 28 as the reduced pressure solvent is vented through end 30 of separator tube 28. Alternatively, the temperature of the mixture leaving the extractor vessel 22 can be changed to decrease the solute solubility and drop the solute out of solution. Of course, the vented gas can be recaptured and reused in a continuous process.

The following example describes the manner and process of making and using the invention and sets forth the best mode known to the inventor for carrying out the invention but is not to be construed as limiting.

An experiment to extract neutrals from crude tall oil soap using supercritical ethylene was conducted employing the apparatus described above and shown in the accompanying drawing. The extractor vessel 22 was loaded with 15.09 grams of tall oil soap containing 4.9% neutrals (determined using a standard solvent extraction/gravimetric procedure to isolate the neutrals). The charged extractor vessel was heated to a temperature of 70° C. and then compressed ethylene at a pressure of 4,000 psi, preheated to a temperature of 70° C., was allowed to enter the extractor vessel and contact the crude tall oil soap present. The supercritical ethylene fluid was passed through the extractor vessel and then allowed to expand at 1 atmosphere pressure immediately prior to entering the separating tube 28 described above. Visual observation of material being deposited in the separator tube 28 was an indication of material solubility and extraction at the 4,000 psi pressure. The extract (0.54 grams) was found to contain 64% by weight neutrals by the extraction/gravimetric procedure. This represents 46.6% of the neutrals found in the original soap subjected to extraction. A summary of gas chromatographic determinations of the neutrals separated by normal solvent extraction from the materials deposited in the separator to be is shown in the following table.

| GC NEUTRALS | NEUTRALS PORTION OF THE OVERHEAD EXTRACT SAMPLE (LB/100 LB NEUTRALS) |
|---|---|
| Hydrocarbons | 4.8 |
| Aldehydes | 6.1 |
| Alcohols | 39.7 |
| Other Neutrals | 49.4 |
| TOTAL | 100.0 |

Following the above procedure but replacing the ethylene gas as used therein with other gases such as propane, propylene, ethane and methane, and subjecting these gases to supercritical conditions, similar results are obtained in the extraction of neutrals from tall oil soaps.

The residue of tall oil soap material left in the extractor vessel 22 upon acidification yields a mixture of fatty/resin acids apart from the separated neutrals.

What is claimed:

1. A process for separating neutral compounds from tall oil soaps, which comprises;
   contacting tall oil soap with a supercritical fluid solvent for the tall oil neutral compounds whereby neutrals are extracted into said solvent to form a mixture of solvent and extract;
   separating the mixture from the remainder of the contacted soap; and
   separating the solvent from the mixture.

2. The process of claim 1 wherein the remainder of the contacted soap is converted to the corresponding tall oil fatty/resin acids.

3. The process of claim 1 wherein the solvent is a supercritical hydrocarbon fluid.

4. The process of claim 3 wherein said fluid is ethylene.

5. The process according to claim 1 wherein the fluid has a critical temperature of 0°–300° C.

6. The process according to claim 1 wherein mixtures of fluids in the supercritical state are used.

7. The process according to claim 1 wherein the process fluid is under a pressure of at least 5 psi greater than the critical pressure of the solvent.

* * * * *